United States Patent

[11] 3,540,538

[72] Inventors Robert H. Connors
 Chicago;
 King L. Klopfenstein, Prospect Heights, Illinois
[21] Appl. No. 783,330
[22] Filed Dec. 12, 1968
[45] Patented Nov. 17, 1970
[73] Assignee Triangle Package Machinery Company
 Chicago, Illinois
 a corporation of Illinois

[54] FEEDING ASSEMBLY FOR WEIGHING MACHINES
 9 Claims, 7 Drawing Figs.
[52] U.S. Cl. ................................................. 177/122, 177/119
[51] Int. Cl. .................................................. G01g 13/08
[50] Field of Search .................................... 177/119-–123

[56] References Cited
UNITED STATES PATENTS
| | | | |
|---|---|---|---|
| 2,822,024 | 2/1958 | Himmelheber et al. | 177/121X |
| 3,117,639 | 1/1964 | Dreeben | 177/122X |
| 3,175,632 | 3/1965 | Rouban | 177/120X |
| 3,416,619 | 12/1968 | McClusky | 177/123X |

Primary Examiner—Robert S. Ward, Jr.
Attorney—Johnston, Root, O'Keeffe, Keil, Thompson & Shurtleff ABSTRACT: A tray or conveyor assembly for the bulk and dribble feeding of a product to be weighed to an automatic weighing machine. The dribble feed portion of the tray has a part thereof overlying a portion of the bulk feed tray and is so designed that an excess of the product to be weighed is placed initially on the dribble side and some of the pieces will drop therefrom onto the bulk side of the tray before the discharge end is reached, thus obtaining a more uniform rate of dribble feed. This construction combined with a bulk accumulator enables continued vibration of the bulk tray during dribble feed.

Patented Nov. 17, 1970
3,540,538
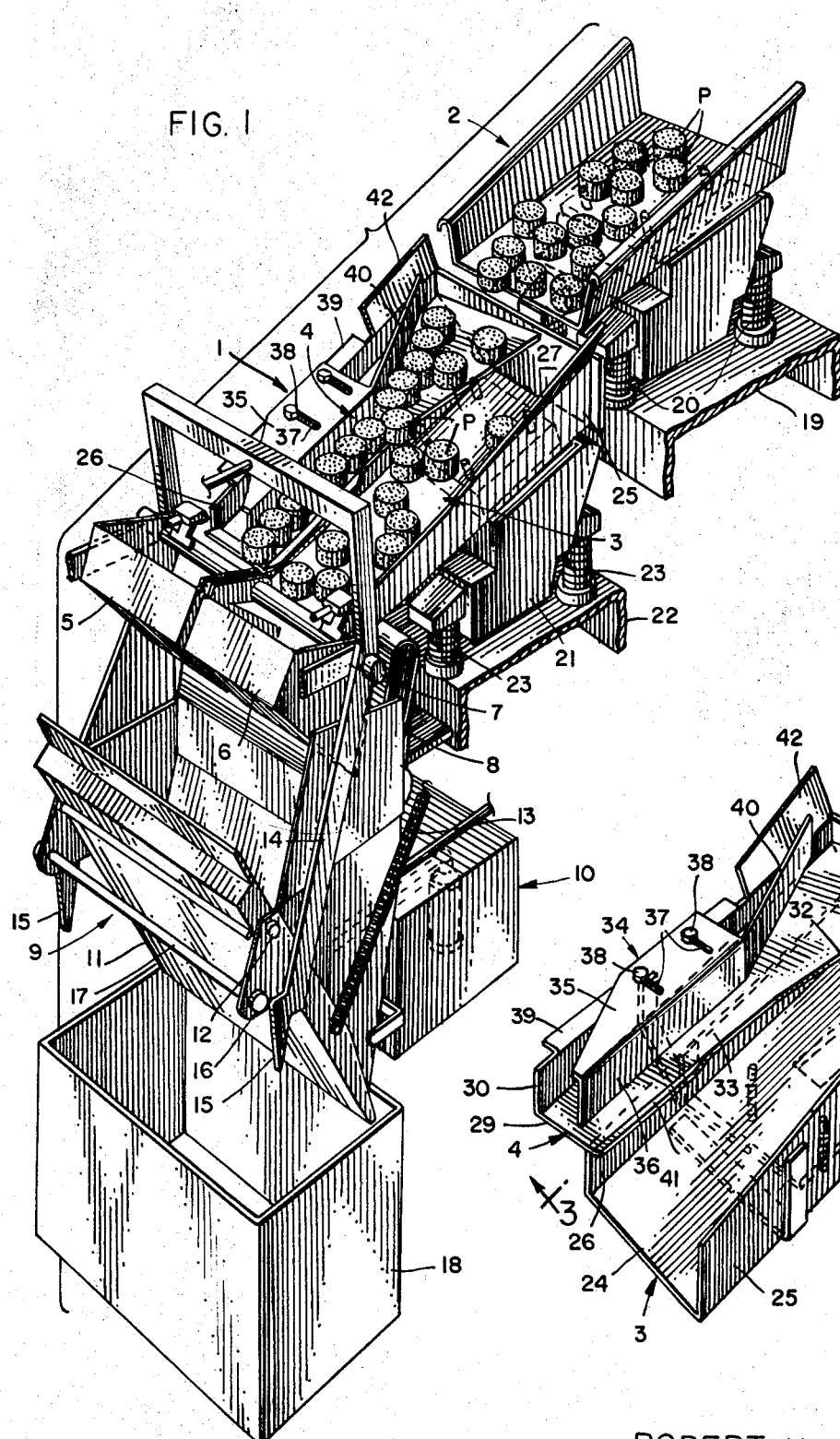
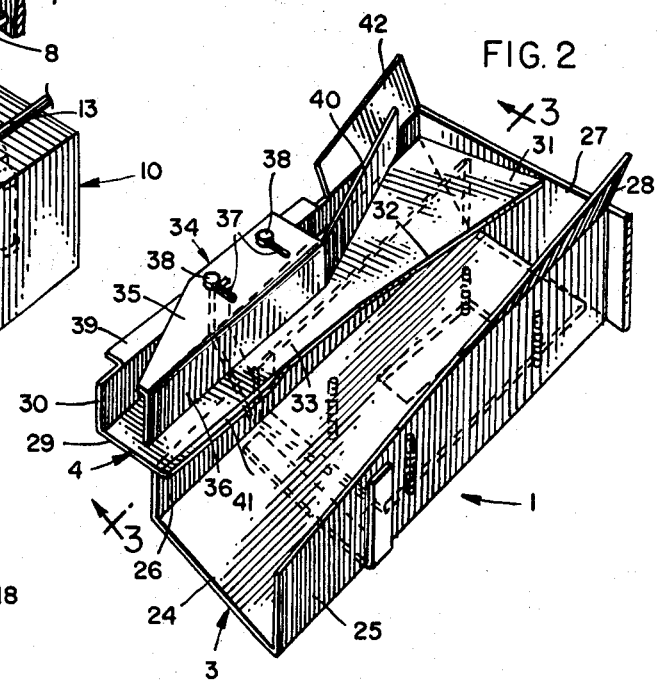
INVENTORS:
ROBERT H. CONNORS
KING L. KLOPFENSTEIN
BY: Marzall, Johnston, Cook & Root
ATT'YS Patented Nov. 17, 1970

INVENTORS:
ROBERT H. CONNORS
KING L. KLOPFENSTEIN
BY: Marzall, Johnston, Cook & Root
ATT'YS

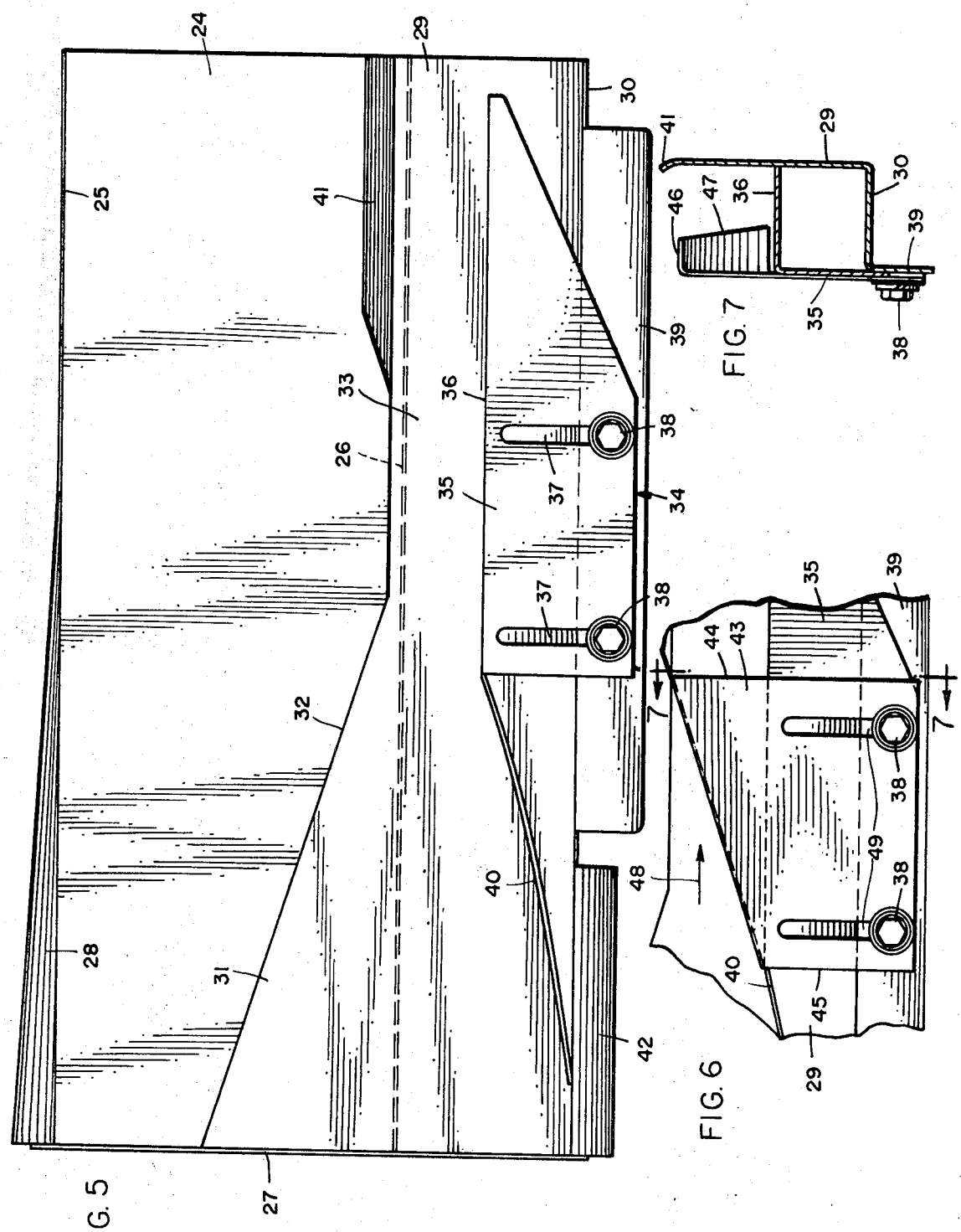

FEEDING ASSEMBLY FOR WEIGHING MACHINES

BRIEF SUMMARY OF THE INVENTION

The present invention is directed to a novel design of a feed tray assembly having bulk feed and dribble feed trays as a part thereof for feeding product pieces to be weighed to a weighing machine at a substantially uniform rate. Examples of product to which this invention is particularly directed include cookies, marshmallows, wrapped candy, and the like, but the product is by no means limited to those specifically mentioned herein.

It is most important to have as uniform a rate of feed as possible for accuracy in the final weight. Heretofore two separate trays or feed troughs have been used, one for the bulk feed and one for the dribble feed. It is customary that both of these trays vibrate during the conveying of the product pieces to the weighing device or weigh bucket, but just prior to reaching the final weight, the bulk feed to the weigh bucket is interrupted while the dribble feed continues to discharge until the desired weight is reached, whereupon the feed of the dribble tray to the weigh bucket is interrupted. After the final weight is reached, the product then in the weigh bucket is discharged in to a chute and a new weigh cycle begins.

As will be seen hereinafter, the tray assembly of the present invention is illustrated in connection with accumulators. It is especially important that an accumulator be used with the bulk feed and that product continue to be fed to the bulk accumulator while the dribble feed continues to the weigh bucket. The purpose of the dribble accumulator will be explained more fully hereinafter. These accumulators may then open and dump an accumulation of the product into the weigh bucket at the beginning of the next cycle. It will be understood, however, that under certain circumstances it may be desirable to use a gate at the discharge end of the bulk tray instead of an accumulator whereby pieces will accumulate on the end of the bulk tray by the continued action of its vibrator during dribble.

In the present invention both the bulk and dribble trays vibrate together continuously and they are preferably, although not necessarily, constructed integral with each other. The product is fed from a suitable source of supply to both the bulk and dribble trays simultaneously while they are both vibrating and carrying product pieces toward their discharge ends. The dribble tray has a portion thereof overlying a part of the bulk tray and is so designed that some of the pieces on the dribble tray will be pushed off onto the bulk tray as they travel toward the discharge end. This enables the product pieces to line up single file in the dribble tray as they near the discharge end thereof, thereby increasing the consistency of the dribble feed and the accuracy of the final weight. The use of an accumulator or gate at the bulk side enables the bulk tray to continue to vibrate during dribble feed whereby to prevent any pileup of pieces by providing space on the bulk tray into which pieces may drop from the dribble tray.

One of the features of the invention is the provision of an adjustment to vary the effective width of the dribble tray in accordance with the size of the product pieces being weighed.

In view of the foregoing, it is the principal object of the present invention to provide an improved bulk and dribble tray assembly for feeding product pieces to a weighing device whereby to achieve greater accuracy of weight in less time than has heretofore been possible.

Another object is to provide such a bulk and dribble tray assembly wherein both trays vibrate together simultaneously throughout the feeding and weighing operation, thereby to obtain greater uniformity in bulk discharge.

A further object is to provide a bulk and dribble tray assembly wherein the product pieces are fed to both trays simultaneously from a source of product supply and wherein some of the pieces initially received by the dribble tray are pushed by other pieces onto the bulk tray before the discharge end is reached, thereby obtaining greater uniformity in the rate of dribble discharge.

A still further object is to provide an adjustable wall on the dribble tray whereby the effective width of such tray may be varied to accommodate product pieces of different sizes.

Still another and specific object of the invention is to provide an accessory which may be used with product pieces of the type and size which tend to pile on top of each other, and which will be effective to push from the dribble tray onto the bulk tray any and all product pieces which may have accumulated on top of the first layer thereof.

Other objects and advantages of the invention will become apparent upon reading the following description taken in conjunction with the accompanying drawings, in which:

FIG. 1 is a perspective view showing the tray assembly of the present invention is association with certain other pertinent parts of a weighing machine;

FIG. 2 is a perspective view of the tray assembly of the present invention by itself;

FIG. 5 is a plan view of the tray assembly embodying the present invention;

FIG. 6 is a fragmentary plan view of a portion of the tray assembly illustrating an accessory which may be used to prevent product pieces from arranging themselves in more than one layer as they approach the discharge end of the dribble tray, and FIG. 7 is a transverse sectional view taken substantially along the plane of line 7–7 in FIG. 6.

DETAILED DESCRIPTION

Figure 3:
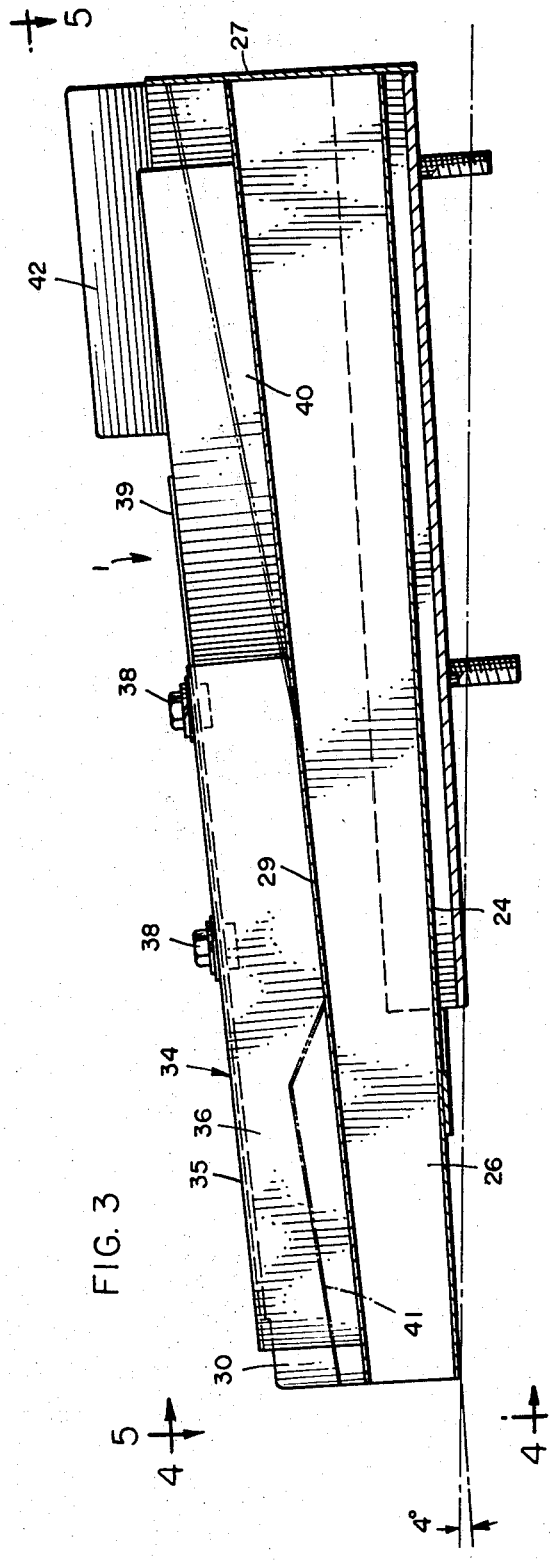
FIG. 3 is a longitudinal sectional view of the tray taken substantially along the plane of line 3–3 of FIG. 2.

Referring now more particularly to the drawings and especially to FIG. 1, the feed tray embodying the present invention is indicated generally by the numeral 1. Product pieces P are fed or conveyed to this feed tray from a rear tray generally indicated by the numeral 2. The feeding tray 1 is comprised of a bulk tray 3 and a dribble tray 4 which are preferably formed integral with each other to make up the feeding tray assembly, although it will be evident that these two trays or tray portions can be formed separately but positioned in the same relationship with respect to each other, without departing from the spirit of the invention.

The product pieces are dumped onto the feeding tray from the rear tray, some of which will be conveyed to the discharge end thereof along the bottom of the bulk tray 3, and others will be conveyed to the discharge end of the dribble tray 4. As illustrated in FIG. 1, the discharge end of the dribble tray is provided with a dribble accumulator 5 and the discharge end of the bulk tray 3 is provided with a bulk accumulator 6.

As is well known in weighing devices of the prior art, flow of product to the weigh bucket from the bulk tray is interrupted shortly before the final weight is reached, while the discharge of product from the dribble tray continues. Discharge from the dribble tray is stopped when final weight is reached and the product is then discharged from the weigh bucket into suitable containers or packages.

As illustrated, these accumulators 5 and 6 are adapted to be rotated about the pivot 7 between open and closed positions. An accumulator backup plate 8 is provided against which accumulators 5 and 6 may come to rest in their closed positions.

A weigh bucket generally indicated by the numeral 9 is positioned below the accumulators and below the discharge ends of the bulk and dribble trays into which the product is discharged therefrom. The weigh bucket is operatively associated with a weigh cell 10 in a manner well known by those skilled in the art and suitable devices are provided to close the accumulator 6 to the bulk tray at a predetermined weight prior to the final weight, and thereafter the accumulator 5 to the dribble tray is automatically closed when final weight has been reached.

The weigh bucket 9 is provided with a door 11 which is mounted for rotation on pivot means 12. The door is normally held in closed position by yieldable means, such as the tension spring 13.

Various mechanisms may be provided to operate the various parts, but as illustrated herein there may be a pair of arms 14 rotatable about one end thereof and provided at their opposite ends with a finger 15, the edge of which is adapted to bear against the ends 16 of a rod 17 extending between the sides of the weigh bucket. When the arms 14 are caused to pivot, the fingers 15 will bear against members 16 and move the weigh bucket door 11 to open position about the pivot 12. The weighed product in the weigh bucket will then be discharged downwardly through the discharge chute 18 into a package or a carton which is thereafter sealed and conveyed away from the machine.

As is customary, vibrating mechanism is provided for vibrating the rear tray as well as the bulk and dribble trays, so that there will be a constant movement of the product pieces toward the discharge ends of the respective trays. Thus, the rear tray 2 is resiliently or yieldably mounted on a support 19 by springs 20 so that a vibratory motion will be imparted to that tray. The feeding tray 1 embodying the present invention is adapted to be mounted on a vibrator 21 which in turn is resiliently mounted on a support 22 by springs 23. This also then enables a vibratory motion to be imparted to the bulk and dribble trays.

One of the problems which has been encountered heretofore when separate bulk and dribble trays were used, was the uneven bulk buildup which occurred in the bulk tray. It then became necessary to stop the bulk tray vibration at the time of reaching the predetermined weight prior to final weight while the dribble tray continued to vibrate and feed product pieces until final weight was achieved. In the present invention bulk and dribble trays vibrate concurrently, that is, the vibration of the bulk tray continues during dribble feed, and when the predetermined weight prior to final weight is reached, the bulk accumulator will close while the trays continue to vibrate. Thus, product pieces are accumulated as they are discharged from the bulk tray while the product pieces continue to fall into the weigh bucket from the dribble tray until final weight is reached.

One purpose of providing an accumulator or a gate on the dribble side is to prevent one or more of the product pieces from reaching the weigh bucket after the final weight has been reached.

After the product has been discharged from the weigh bucket and the door 11 again closed, then the accumulators 5 and 6 will open and drop the accumulated pieces into the weigh bucket for the next cycle.

Referring to the tray assembly itself, as illustrated in the remaining FIGS. of the drawings, it will be described as a unitary feeding tray having a bulk side and a dribble side, or a bulk tray and a dribble tray assembled as a single unit. The bulk side of the assembly comprises a bottom 24, an outer upstanding side 25, and an inner upstanding side 26. The receiving end of the tray which receives the product pieces P from the rear tray is preferably provided with an upstanding end wall 27. An upwardly and outwardly inclined wing portion 28 extending from the upper edge of the side 25 is provided for the purpose of guiding product pieces into the bulk tray from the rear tray 2.

The dribble tray or side of the assembly which is generally indicated by the numeral 4 has a bottom 29 which slopes downwardly toward the outer upstanding side 30. At the receiving end of the dribble side, the bottom 29 is wider than the discharge end. This greater width is accomplished by providing a lateral extension 31 which overlies a portion of the bulk tray and has an edge portion as indicated at 32 which converges angularly toward the side wall 30 to provide a narrower portion 33 of the bottom 29.

As indicated heretofore, the product pieces are dumped onto the tray assembly from the rear tray, some of which fall onto the bulk side and some of which fall onto the dribble side. Those pieces falling onto the dribble side will tend to move toward the side 30 due to the slope of bottom 29. As the product pieces move toward the discharge end, the edge 32 of the dribble tray will allow excess pieces to fall from the bottom 29 of the dribble tray into the bulk side of the assembly. By the time the narrower portion 33 is reached, the product pieces will be in single file, as shown in FIG. 1, and will be discharged therefrom one at a time.

The size of the pieces may vary and it may not always be desirable to have the pieces line up single file. It may be desirable to have two or three in a line instead of one, such as for example, in the case of nuts, miniature marshmallows, or the like. When small items such as these are being weighed and packaged, each piece normally weighs such a small amount that it would not be practical to drop them one at a time from the dribble tray because of the time factor involved. Thus, the capacity of the dribble tray can be adjusted for these small items to allow two or three in a line instead of one.

The size or capacity of the dribble tray may be varied by the use of a feed control plate generally indicated by the numeral 34. This feed control plate comprises a substantially horizontal portion 35 and a substantially vertically extending wall portion 36 extending downwardly therefrom. The horizontal or top part 35 is provided with a pair of transversely extending slots 37 adapted to receive bolts 38. These bolts extend downwardly through a lateral flange 39 extending outwardly from the upper edge of the outer wall or side 30. The wall 36 extends longitudinally of the tray and has the rear portion thereof bent angularly to form the yieldable wall portion 40. This portion 40 is adapted to bear at its rear end against the upstanding side 30 in any position to which the feed control plate may be adjusted so that the product pieces on the enlarged portion 31 of the dribble tray bottom will be guided toward the narrow part thereof where they are conveyed to the discharge end in either single file or in rows of two or three, depending upon the size thereof. The inner edge of the bottom 29 of the dribble tray at the discharge end thereof is preferably provided with an outwardly and upwardly inclined wall portion 41 for the purpose of preventing product pieces from falling into the bulk tray as they approach the discharge end.

It will be evident from viewing the various figures of the drawing that for large product pieces, such as cookies, it may be desirable to adjust the feed control plate 34 outwardly of the dribble tray so that the narrow portion 33 thereof may be made wider. The width of this narrow portion can be adjusted in accordance with the size of the particular product pieces being weighed and packaged. For marshmallows or other pieces of comparable size, the feed control plate may be adjusted inwardly as shown for example in FIGS. 1 and 2, so that the width of the narrow part 33 will be substantially that of the width of the marshmallow. For small items such as nuts or miniature marshmallows, the feed control plate may be adjusted so that this narrow portion 33 of the dribble tray will accommodate two or three in a line.

The receiving end of the dribble tray is also provided with an upwardly and outwardly inclined wall portion 42 for the purpose of assisting in guiding the product pieces into the tray and preventing them from dropping over the side thereof. The slope of the bottom 29 prevents voids between adjacent pieces. The force of the pieces against the walls 40 and 36 due to the inclined bottom maintains the pieces close together, thereby preventing voids and increasing the accuracy of the final weight in a given time cycle.

Figure 4:
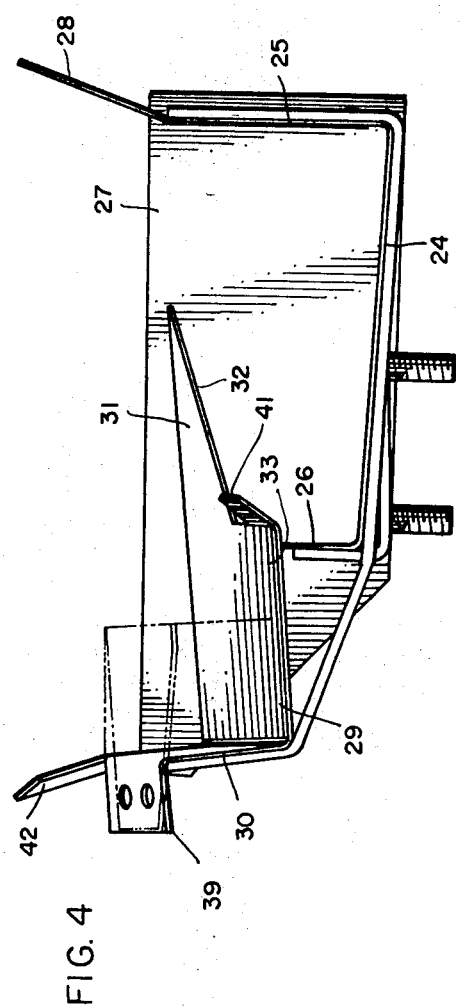
FIG. 4 is an end elevational view of the tray looking in the direction of the arrows 4–4 on FIG. 3.

It is also to be noted that the bottom 24 of the bulk tray slopes laterally in the opposite direction for the primary purpose of creating space adjacent the dribble tray into which the product pieces may drop from the dribble tray. This, then, prevents a pile-up of the pieces into several layers and is conducive to a single layer being discharged from the bulk tray into the weigh bucket. These relative slopes or lateral inclinations of the bottoms of the bulk and dribble trays may be more apparent upon viewing FIG. 4.

It is also to be noted, as may be clearly seen in FIG. 3, that both the bulk and dribble tray bottoms slope downwardly toward their discharge ends. It is preferred that the slope of the dribble tray toward the weigh bucket be greater than the slope of the bulk tray for greater speed of feed at the dribble side. As an example, extremely satisfactory results have been obtained with respect to accuracy and speed where the inclination of the bulk tray toward the weigh bucket is approximately 4° with respect to the horizontal, and where the inclination of the dribble tray toward the weigh bucket is approximately 3° greater, or about 7° with respect to the horizontal.

The primary purpose of any weighing device is to obtain the greatest accuracy of final weight in the shortest period of time. The bulk feed rate is generally 3 to 6 times greater than the dribble feed rate. Thus, when the bulk feed is stopped at a predetermined weight short of the final weight, the consistency of the dribble feed will increase the accuracy of the final weight. Thus, the feed tray design embodying the present invention achieves this consistency of the dribble feed, resulting in the increased accuracy of the final weight. Uniform feed rate of both the bulk and dribble sides in ounces per second is highly desirable and the present arrangement will achieve this uniform feed rate even for small pieces.

In some instances the product pieces may be such as to tend to pile on top of each other and result in multiple layers. This is particularly undesirable on the dribble side. When such a product is being weighed and packaged, it is desirable to utilize the accessory disclosed in FIGS. 6 and 7. In these figures there is shown a device consisting of a flat top plate 43 adapted to overlie the upper plate 35 of the feed control plate. This plate 43 has a horizontal edge 44 extending transversely of the dribble side adjacent the discharge end thereof. This plate 43 also has a rear edge 45 extending transversely of the dribble side which edge is shorter than the edge 44. The plate is then provided with a downwardly extending flange 46 which extends between the inner ends of the edges 44 and 45 whereby the flange 46 extends in an angular direction between the front and rear edges 44 and 45. The bottom edge of the flange 46 is also provided with a taper, as shown at 47, and the distance between the bottom 29 of the dribble tray and the lower edge 47 of the flange 46 is determined to be greater than the height of one product piece but less than the height of two product pieces one on top of the other.

It will thus be evident that when product pieces are moved toward the discharge end of the dribble tray in the direction of the arrow 48 in FIG. 6, any pieces which have come to rest on top of other pieces to form a second layer will encounter the flange 46 and be pushed to one side onto the bulk tray. This arrangement will assure the desired uniform feed rate from the dribble tray to the weight bucket even though the product pieces are of such sizes and shapes as to tend to move in multiple layers. The top plate 43 is provided with elongated slots 49 so that the plate may be secured in place and adjusted by the same bolts 38 used to secure the feed control plate in adjusted position.

The foregoing construction has been found in actual practice to obtain the desired accuracy of final weight in a shorter period of time than has heretofore been possible. The construction achieves the uniform feed rate at the dribble side by insuring discharge therefrom of a single layer of pieces which are in single file for larger pieces, and two or three in a line for smaller pieces. Uniform rate of dribble discharge is obtained by placing an excess of the product on the dribble tray at the wider portion thereof and then forcing the excess product onto the bulk tray before the discharge end of the bulk tray is reached.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

We claim:

1. A feeding assembly for weighing machines wherein concurrently vibrating bulk and dribble trays receive product pieces from a source and discharge them to weighing means, and wherein bulk feed to the weighing means is interrupted before reaching final weight, said assembly comprising, a bulk tray adapted to receive product pieces from a source of product supply, a dribble tray adapted to receive product pieces from a source of product supply, said dribble tray being positioned above and laterally offset from said bulk tray and having a lateral extension at one side thereof at its receiving end overlying said bulk tray, whereby product pieces in excess of those to be discharged therefrom at the discharge end thereof will be received by said extension, an upstanding wall extending along the other side of said dribble tray, and means to move product pieces on said dribble tray toward said upstanding wall, whereby excess product pieces received by said dribble tray will drop onto said bulk tray before reaching the discharge end thereof, thereby achieving a more uniform rate of dribble feed.

2. The combination of elements defined in claim 1 wherein the edge of said lateral extension which overlies said bulk tray is angularly disposed so that the width of said dribble tray is greater at the receiving end thereof and diminishes toward the discharge end thereof.

3. The combination of elements defined in claim 1 wherein the bottom of said dribble tray is inclined downwardly toward its discharge end at an angle with respect to the horizontal greater than that of the bulk tray.

4. The combination of elements defined in claim 1 wherein said last named means comprises inclining the bottom of said dribble tray laterally downwardly in a direction away from said bulk tray.

5. The combination of elements defined in claim 4 wherein the bottom of said bulk tray is inclined laterally downwardly in the opposite direction.

6. A feeding assembly as defined in claim 1, and feed control means for varying the effective width of said dribble tray whereby uniform feed rate is maintained for product pieces of different sizes.

7. A feeding assembly as defined in claim 1, and means associated with said dribble tray positioned in the path of movement of the product pieces toward the discharge end thereof, to intercept pieces above a single layer thereof and direct them to said bulk tray.

8. The combination of elements defined in claim 6, said feed control means comprising a wall extending in a direction lengthwise of said dribble tray, means mounting said wall for adjustment laterally of said dribble tray, and means to secure said wall in adjusted position.

9. The combination of elements defined in claim 1, and means for rigidly securing said bulk and dribble trays together to provide a unitary structure.